United States Patent [19]
Jallerat et al.

[11] Patent Number: 5,556,591
[45] Date of Patent: Sep. 17, 1996

[54] MEMBRANE SEALING TECHNIQUES USING THERMOPLASTIC POLYMERS

[75] Inventors: Eric Jallerat, Ville D'Avray; Jean Lemonnier, Le Vesinet, both of France

[73] Assignee: Millipore S.A., Saint Quentin-En-Yvelines Cedex, France

[21] Appl. No.: 292,982

[22] Filed: Aug. 19, 1994

Related U.S. Application Data

[63] Continuation-in-part of Ser. No. 5,710, Jan. 19, 1993, Pat. No. 5,413,925.

[30] Foreign Application Priority Data

Jan. 21, 1992 [FR] France ................................. 92 00591

[51] Int. Cl.⁶ ............................ B29C 39/10; B29C 65/54
[52] U.S. Cl. ......................... 264/516; 264/263; 264/279; 264/571; 156/285; 210/321.8; 210/321.89; 210/500.23
[58] Field of Search .................................. 264/510, 511, 264/516, 571, 573, 261, 279, 555, 562, 263; 210/321.8, 321.89, 450, 500.23; 156/285

[56] References Cited

U.S. PATENT DOCUMENTS

| | | | |
|---|---|---|---|
| 3,932,570 | 1/1976 | Cox et al. | 264/279.1 |
| 4,269,712 | 5/1981 | Hornby et al. | 210/321.8 |

*Primary Examiner*—Catherine Timm
*Attorney, Agent, or Firm*—Andrew T. Karnakis

[57] ABSTRACT

A process for potting hollow fibers within a body is disclosed wherein a bundle of hollow fibers is formed within a hollowed portion of the body such that the fibers are substantially aligned and uniformly spaced. A molten thermoplastic composition is dispensed into the body at a contact temperature below the melting point of the hollow fibers. The bundle and the body are both at a temperature which is sufficiently low enough to cause solidification of the molten composition substantially upon contact with the bundle. A pressure differential is applied to the body to assist the flow of the thermoplastic composition around each of the hollow fiber elements such that the bundle and the interior of the hollowed portion of the body are encapsulated by the thermoplastic composition thereby assuring reliable sealing between the hollow fiber elements and the interior of the hollowed portion of the body.

6 Claims, 4 Drawing Sheets

MEMBRANE SEALING TECHNIQUES USING THERMOPLASTIC POLYMERS

CROSS-REFERENCE TO RELATED APPLICATIONS

This application is a continuation-in-part of U.S. Ser. No. 08/005,710, filed Jan. 19, 1993 now U.S. Pat. No. 5,413,925.

BACKGROUND OF THE INVENTION

The present invention relates to a device for the fermentation of drinks containing sugar and in particular the preparation of sparkling wine such as champagne by a second fermentation, or refermentation of a still wine in the bottle.

The traditional so-called "champagne" method consists of adding a "liqueur de tirage" containing sugar and the fermentation yeast necessary for the conversion of the sugar into carbon dioxide to still ordinary wine, which has already undergone a first alcohol fermentation. Bottling may be carried out before or after these additional stages.

The bottles are then corked using a hollow plastic stopper inserted into the neck of the bottle and sealed by crimping a metal cap. They are then generally stored horizontally "on slats" for a long period of time lasting from several months to several years in cellars where the temperature is kept constant, generally between 10° and 15° C. so that fermentation takes place with a corresponding rise in pressure or "bottle fermentation" in the bottles.

At the end of this long fermentation period, each bottle must be shaken individually several times in order to dislodge the fermentation deposit which might stick to the walls of the bottle. During this shaking period the bottles are also inclined then stored "on the point", that is to say inclined with the neck downwards, to facilitate the decanting of the yeasts and encourage the fermentation waste products to be deposited inside the hollow plastic stopper situated in the neck of the bottle.

Once shaking is completed, the bottles are transported vertically, with the neck downwards, and are plunged in a refrigeration brine bath maintained at about −20° C. in order to form, by freezing, a plug of frozen wine containing the fermentation yeast waste products.

The bottles then undergo a disgorging operation which consists of vertically placing the bottles with the thus frozen neck upwards and of decapping them, which causes, under the action of the pressure inside the bottle, the ejection of the plastic stopper together with the frozen plug containing the fermentation sediments.

The original level of the bottles is then restored by the addition of a "liqueur d'expedition" and the bottle is sealed with a permanent stopper which is generally made of cork.

The traditional so-called "champagne" method that has just been described requires significant manual labor, in particular after fermentation when the bottles are shaken, an act often carried out by hand. This method also involves a large surface area for storing the bottles on special racks and a rather long storage time which may be more than one month. In addition, the traditional method includes a stage of freezing the neck of the bottles, which is indispensable for the elimination of the yeasts.

Attempts have been made to try to remedy these drawbacks.

U.S. Pat. No. 4,792,454 assigned to Millipore Corporation, the parent company of the assignee of this application, describes a process for fermenting wine in the bottle according to the champagne method. This prior art process includes the introduction of a tubular filter cartridge into the neck of the bottle of wine which has had added to it the quantity of sugar necessary to obtain the desired final pressure of carbon dioxide. This cartridge has a perforated tubular body, externally coated with a hydrophilic filter membrane and a hydrophobic filter membrane and contains the yeasts necessary for the fermentation of wines containing sugar with release of carbon dioxide. The use of such a filter cartridge has the advantage of eliminating the need for a shaking stage which allowed the deposit of yeasts to be concentrated in the neck of the bottle, as well as the requirement of freezing the neck of the bottle, which allowed the plug containing the yeast residues to be frozen and ejected, since the yeasts are no longer in contact with the inside of the bottle. The technique described in this U.S. patent does, however, have certain drawbacks.

In fact, it has been observed that the rise in pressure of the carbon dioxide in wine bottles fitted with a cartridge according to the teachings of U.S. Pat. No. 4,792,454 required a longer time than that necessary for fermentation according to the traditional champagne method. Such an increase in the duration of bottle fermentation results in an unacceptable modification of the organoleptic properties of the wine which has undergone a second fermentation under these conditions.

Furthermore, during experiments carried out to identify the mechanisms involved during bottle fermentation according to the aforementioned U.S. patent, it was noted that the cartridge, filled with yeast and immersed in wine, quickly emptied itself of any liquid under the pressure of the carbon dioxide produced by the yeast. The gas thus accumulated inside the cartridge only escaped (in the form of bubbles) through the vent, constituted by the hydrophobic membrane, when the pressure was sufficient to overcome the forces of surface tension. This filter cartridge therefore acts as a surface fermentor, in which only the yeasts in contact with the hydrophilic membrane are wetted by the wine and can therefore live and consume the sugar.

Furthermore, during the fermentation reaction, the yeasts which consume the sugar while producing mainly ethanol and carbon dioxide release energy in the form of heat. Hence the wine in contact with the yeasts is depleted of sugar and simultaneously its temperature is raised slightly by the fermentation reaction, and then it is replaced due to thermal convection by wine which is colder and richer in sugar. In addition, the structure itself of the cartridge described in the U.S. patent mentioned above, where the surface of the membrane lined on the inside with yeasts acts as a heat generator, limits the convection currents due to its cylindrical shape and its bulkiness in the neck of the bottle.

The fabrication of hollow fiber membrane devices is well known in the art. To make an effective separation device, the hollow fibers must be potted or bonded together at one end, inserted into a housing and sealed therein to obtain a fluid-tight barrier between the inside and the outside of the fibers. Conventionally, the hollow fibers are bundled together and potted at one end (or both ends as the case may be) with an adhesive, such as an epoxy glue or polyurethane. In a second step, the bundled fibers are sealed in an appropriate housing. The use of polyurethane or epoxy adhesives typically involves the use of a centrifuge to assist the adhesive to flow around and between each fiber to assure an adequate seal.

Conventional potting technology suffers frown several disadvantages in addition to the use of centrifugation to overcome viscosity effects. First, the use of adhesives requires a long time to reach complete polymerization, a fact which burdens the overall manufacturing process as there exists a significant amount of residence time before the adhesive becomes hard enough to cut the potted end to expose the lumens of the fibers. Second, these adhesives are a persistent source of organic extractable contaminants as well as particulate matter resulting frown shedding due to the gradual hydrolysis and deterioration of the adhesive. In addition, such adhesives have a tendency to wick up the fibers and wicking can lead to fiber breakage upon physical stress or fatigue.

To overcome these disadvantages, it has also been proposed to utilize thermoplastic resins to join and form the seal around the hollow fibers to create a usable fiber bundle. Such resins may either be pure polymers or can contain adhesive additives which are chemically compatible with the thermoplastic polymer to avoid the aforementioned extractable contaminant/particulate matter problems.

U.S. Pat. No. 5,015,585 (Robinson) describes a process for making a homopolymer hollow fiber module by thermal bonding techniques which first requires insertion of a metal rod into the lumen of each hollow fiber to maintain its shape and integrity during the bonding process. These strengthened hollow fibers are conventionally potted by immersing the fibers into a mold containing a suitable molten thermoplastic. Using this technique, the spaces between the hollow fibers are filled or otherwise melted while keeping the lumens of the fibers open. After bonding is completed, the rods inserted into the fibers are forced through the ends and removed; this is followed by cutting the bundle end to create a through hole for communicating with the interior of the fiber lumen. While Robinson suggests that any thermoplastic polymer can be used to produce a homopolymer module, the disadvantage with this technique is the difficulty in reliably and efficiently inserting a rod into each hollow fiber.

U.S. Pat. Nos. 4,980,060 and 5,066,397 (Muto et al) disclose another process for thermoplastically sealing the ends of a hollow fiber filtration module by first dipping the fiber ends into an inorganic cement (e.g. gypsum) thereby filling a portion of the lumens and allowing it to set. A bundle of fibers is then gathered and the filled ends are potted using a molten thermoplastic resin. Alternatively, the filled ends may be directly fusion bonded together to form the requisite seal. The bonding step is followed by conventionally cutting of the ends and finally dissolving the cement inside the lumen ends with a suitable chemical. This technique is not universally applicable since inorganic cements must be found that do not damage the membrane either by themselves or by the solvent required for their removal. Finally, this technique is undesirable due to the difficulty of the steps involved as well as the potential contamination resulting from the inorganic cement which may not totally be removed.

U.S. Pat. No. 5,228,992 (Degen) discloses a process for enhancing the ends of thermoplastic hollow fibers, e.g. by radiation cross-linking, in order to increase the fiber's ability to withstand the high temperature inherent in injection molding techniques. The ends are subsequently potted by a conventional molding technique. The difficulty with Degen's process is that the fibers have to be specially treated at the ends to render them more stable at high temperatures. Furthermore, cross-linking is not suitable for some polymers, for example fluoropolymers.

All of the aforementioned techniques require a special treatment of the ends of the hollow fibers to render them resistant to the high temperatures necessary to pot the bundle, temperatures so high that the fiber would normally collapse or otherwise completely melt. Additionally, these techniques require that the fiber be processed as single entities rather than as a grouped array. Furthermore, the bundled fibers must then be sealed as part of a further manufacturing step in a suitable housing.

Other processes have been devised which focus on producing a more uniform bundle. U.S. Pat. No. 5,186,832 (Mancusi et al) discloses a method for producing a uniform bundle by first converting the hollow fibers into a fabric with the fibers transversely oriented, in a spaced-apart, mutually parallel relationship and held in place by warp filaments. The device is assembled by spirally winding the fabric made out of hollow fibers to obtain a uniformly-spaced fiber bundle. In this process the fiber bundle is sealed using conventional resinous potting material. In addition to conventional potting methods, this patent discloses a technique for simultaneously applying resinous potting material to the ends of the bundle as the woven fabric is wound rather than subsequently potting the bundle after winding. However, no mention is made of sealing the fiber ends with a molten thermoplastic polymer. Thus the use of adhesive resins in the process taught by the '832 patent suffers from all the disadvantages mentioned above. In addition, this technique involves multiple steps prior to fabricating a finished hollow fiber membrane module.

More recently, U.S. Pat. No. 5,284,584 (Huang et a) discloses techniques for fabricating an all thermoplastic, spirally wound hollow fiber membrane cartridge. Like the Mancusi et al patent (U.S. Pat. No. 5,186,832), Huang et al teaches first preparing a fabric array with transversely oriented warp filaments used to create a uniform spaced-apart bundle of mutually parallel fibers and then bonding in a second step the bundle within a housing. Thus this patent suffers from the same disadvantages in this regard as discussed with respect to Mancusi et al. While this patent teaches that the temperature of the molten resin at the point of contact with the hollow fiber must be lower than the melting point of the fiber, there is no disclosure of bonding the fibers together directly within the housing in one, relatively simple process step.

Thus despite numerous prior attempts, there still exists a need for improvements in the art of designing and efficiently manufacturing a reliable hollow fiber membrane module which is both chemically and mechanically robust and which has essentially no possibility of shedding undesired particulate contaminants or producing other extractables, the manufacture of which may be accomplished in a minimum number of manufacturing steps.

SUMMARY OF THE INVENTION

In order to avoid these various drawbacks, the present invention is directed to an improved device, the implementation of which uses the technique of microporous hollow fibers used essentially for the filtration of water or the dialysis of blood. Fibers of this type are disclosed in particular in European Patent Application EP-A- 138,060.

The improvement according to the present invention consists of a tubular cartridge having a perforated tubular body and one or more microporous elements retaining the yeasts causing fermentation of a beverage containing sugar with the release of carbon dioxide. The cartridge is characterized in that the retaining microporous element or elements are in the form of microporous hollow fibers which are arranged inside the tubular body and filled with the yeasts.

These fibers, which can be either folded in a U shape or be in the form of blind single strands inside the tubular body, can all be hydrophilic in the cartridge according to the invention. Also, either some of the fibers can be totally hydrophilic and some of them totally hydrophobic, or each of them can be partially hydrophilic and partially hydrophobic.

Such an improvement according to the invention not only allows the advantages connected with the use of a cartridge according to the previously mentioned U.S. patent to be retained but also includes the following additional advantages.

First of all, the increase in the porous exchange surface between the wine containing sugar and the inside of the hollow fibers according to the present invention as opposed to the cartridge described in U.S. Pat. No. 4,792,454 is of the order of 5 to 10 times greater, for a cartridge of the same size. It is thus that the total exchange surface of 50 U-shaped porous fibers arranged in a cartridge with a 12 mm internal diameter and 60 mm long is about 5 times larger. This surface, increased in this way to about 100 $cm^2$ exchange surface, corresponds to the surface of a free yeast deposit in a bottle, according to the traditional method.

Also, due to their shape and their being less bulky, the microporous hollow fibers favor, during the fermentation reaction, the formation of much stronger convection currents than in the case of the cartridge of the previously mentioned U.S. patent.

Furthermore, whereas the use of the cartridge described in U.S. Pat. No. 4,792,454 requires protection of the very fragile hydrophilic and hydrophobic membranes welded to the outside of the perforated tubular body by a plastic netting in order to avoid any perforation due to untimely impacts, on the contrary, the microporous hollow fibers, which are supple and therefore floating, do not need any support except for a simple outer protection consisting of the perforated tubular body of the cartridge.

Finally, taking into account the small internal diameter section of the microporous hollow fibers, which is of the order of about 300 micrometers (and their pore diameter which varies from 0.2 to 2 micrometers), the yeasts, which have a size of the order of 3 to 7 micrometers and which are introduced under pressure inside these fibers and line their inner walls, are less likely to decant and to aggregate on leaving these walls than in the cartridge which is the subject to U.S. Pat. No. 4,792,454. The cartridge according to the present invention therefore guarantees due to the presence of these small-diameter hollow fibers the maintenance of a good contact surface between the sugar-containing drink and the yeasts for the total fermentation period.

The invention is also directed to a process for potting hollow fibers within a body suitable for use as a tubular cartridge of the type described above, which includes: (i) immobilizing a bundle of hollow fibers within a first end of a body having a bundle immobilizing means by inserting the bundle into the immobilizing means; (ii) dispensing a molten thermoplastic composition at a temperature below the melting point of the hollow fibers into contact with the bundle, the bundle being initially at a temperature sufficiently low to cause solidification of said composition substantially upon contact with the bundle of fibers; and (iii) applying a pressure differential to the body to assist the flow of the thermoplastic composition, thereby assuring reliable sealing between the hollow fiber elements and the interior of the body.

This process provides a simple, reliable and fast method for manufacturing an all thermoplastic hollow fiber module that is amenable to high-volume commercial production.

These and other objects and advantages of the invention will be apparent upon review of the following detailed description and drawings, and the invention is only limited by the appended claims.

BRIEF DESCRIPTION OF THE DRAWINGS

The present invention will now be described using the attached drawings and in which.

DETAILED DESCRIPTION OF THE INVENTION

Figure 1:
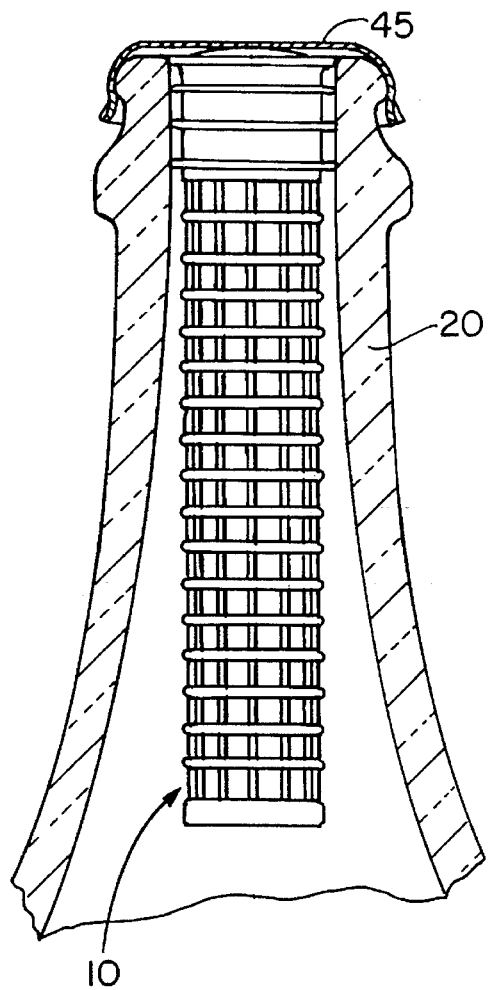
FIG. 1 represents a section along an axial plane of a filter cartridge according to the invention placed in the neck of a bottle.

A microporous hollow fiber cartridge 10 which is the subject of the present invention is shown in FIG. 1 threaded in the neck of a bottle 20 where it has been fixed by a crimped metal cap 45.

The cartridge 10 has a perforated tubular body 11 of generally cylindrical shape the lower end 12 of which is open and the open upper end of which comprises a cylindrical stopper part 13 which has lips 48 providing a seal in the neck of the bottle as the diameter of the lips are greater than that of the tubular body 11.

Figure 2:
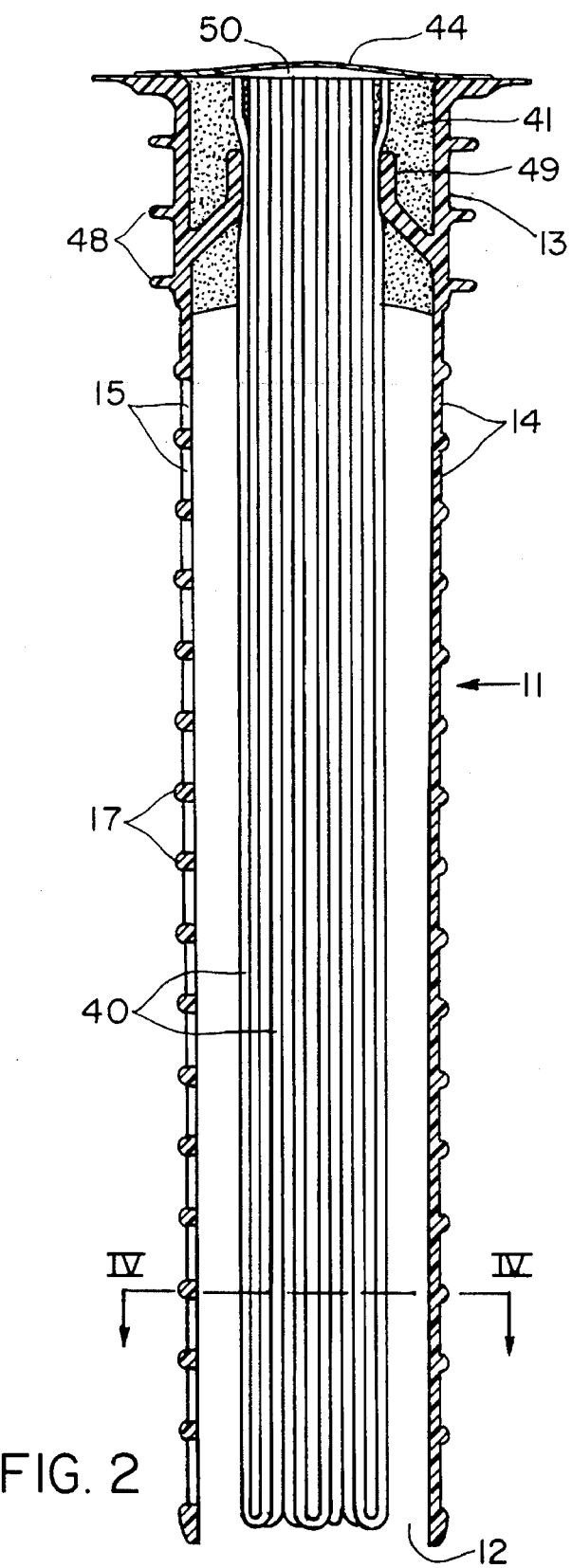
FIG. 2 represents a section along the line 2—2 of FIG. 4 of the filter cartridge of FIG. 1.
Figure 3:
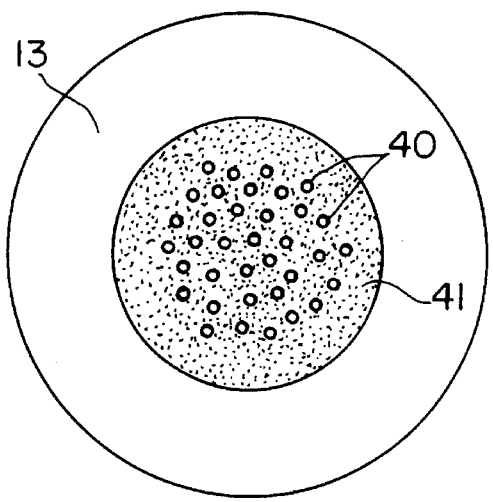
FIG. 3 represents a top view of the cartridge of FIG. 2, of which the plastic film which seals it has been removed in order to show the inside.
Figure 4:
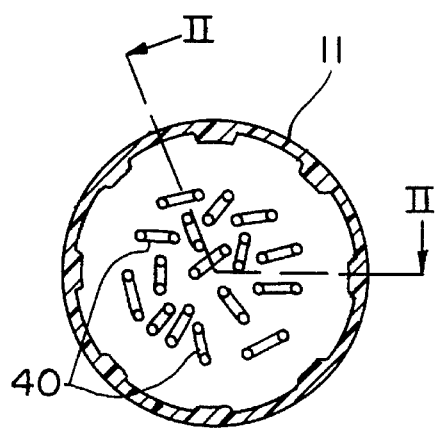
FIG. 4 represents a section along the line 4—4 of FIG. 2.

As shown in FIG. 2, the tubular body 11 is comprised of a series of outer grooves 14 and rings 17 which define perforations 15 which put the inside and the outside of the cartridge in contact with each other.

A plurality of microporous hollow fibers 40 are arranged inside the tubular body 11, where they are folded in a U shape, the base of which is situated near the open end 12 of the tubular body. The two parallel arms of this U-shaped arrangement extend axially the whole length of this body in order to emerge at the upper end of the cylindrical part 13.

The fixing of the hollow fibers 40 is carried out by introducing the fibers 40 folded in a U shape inside the body of the cartridge and sealing them with a plug 41 in the upper part 13 of the cartridge. The material used to form the plug 41 is preferably a thermoplastic resin and not a typical adhesive of polyurethane or epoxy type. Such resins may comprise components other than pure thermoplastic polymers to impart different properties such as lower viscosity or increased adhesion. Nonetheless, the principles of the present invention are intended to encompass pure thermoplastics and mixtures thereof. In fact, thermoplastic resins allow the manufacture of the cartridges according to the invention to be simplified by eliminating, on the one hand, the centrifugation stage necessary to distribute conventional adhesives among several components and, on the other hand, the time consuming polymerization stage. This process is described in more detail hereinafter.

After sealing with the material used for making the plug 41, the microporous hollow fibers 40 are maintained in place by the plug 41 which traps them by sealing them with each other and with the inner wall of the cylindrical stopper part 13.

A cylindrical lip 49, integrally formed and coaxial with the cylindrical part 13, and of a smaller diameter than it, provides the necessary seal around the bundle of fibers in case the material used for making the plug shrinks. It will be noted, as is shown in FIG. 2, that the part 13 and the lip 49 define a channel in the form of a crown which receives the material of the plug 41 so as to surround all the fibers 40 by a cylindrical crown of the plug material. The fibers can then be cut in a plane perpendicular to the axis of the cartridge and corresponding to the open upper end of the cylindrical part 13.

The microporous hollow fibers 40, which are available commercially from a variety of vendors such as Akzo N. V. and Mitsubishi Rayon Co. Ltd., consist of plastic fiber such as polyamides, polysulphones, polyethersulphones, polyesters such as cellulose triacetate and polyolefins such as polyethylene or polypropylene. They have an internal diameter of between 100 and 500 micrometers and an external diameter of between 200 and 600 micrometers. The pore diameter of 0.2 to 2 micrometers varies according to the nature of the polymer and the manufacturing process.

Figure 5:
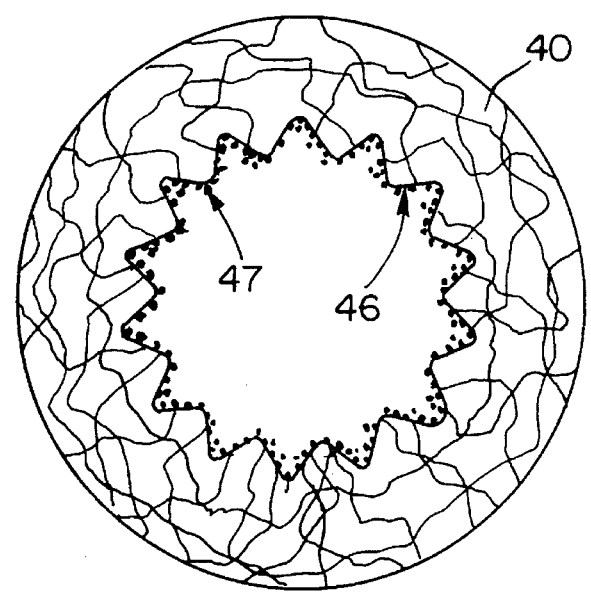
FIG. 5 represents a cross-sectional view of a specific embodiment of a microporous hollow fiber used in the cartridge according to the invention.

Preferably the cartridges according to the invention include microporous hollow fibers the inner surface of which has been modified so as to present longitudinal inner contours. As is shown for example in FIG. 5 the cross section of the fibers 40 includes inner contours 46 which can be crenellated or star-shaped. Such contours are obtained directly when the hollow fiber is extruded due to the special shape of the die, generally in the form of a needle, through which the fiber is extruded. These inner contours 46 improve the attachment of the yeasts 47 to the inner walls of the fiber and also allow the exchange surface area to be increased.

According to the implementation represented in FIG. 2, most of the hollow fibers are hydrophilic, one or more fibers being hydrophobic, which allows the carbon dioxide to be evacuated during the fermentation of the wine.

After the hollow fibers 40 have been filled with the leaven containing the appropriate yeast, the upper opening of the cylindrical part 13 is preferably closed by a plastic film 44 welded onto the upper surface of the part. The plastic film 44 as well as the special cut of the plug 41 create a chamber 50 which permits communication between the inside of all the hollow fibers. Thus the carbon dioxide gas resulting from the yeasts situated in the hydrophilic fibers makes its way to the chamber 50 and is then evacuated into the wine in the bottle via the hydrophobic fibers.

In the absence of hydrophobic fibers the carbon dioxide gas can nevertheless be evacuated either when its pressure is sufficiently high to pass through the hydrophilic fibers or if the convection is sufficiently strong to evacuate the gas in its dissolved form. However, such a rise in the pressure of the carbon dioxide gas inside the hydrophilic hollow fibers, which occurs after the start of fermentation, can be detrimental to the metabolism of the yeasts and tends to increase the time necessary for the bottle fermentation. To avoid these drawbacks, it is preferable but not essential that the cartridge 10 contains at least one fiber 40 which is partially or completely hydrophobic, and which is in communication with the exterior of the other hydrophilic hollow fibers.

When fermentation is finished and when the metal cap 45 holding the cartridge in the neck of the bottle is removed, the pressure existing inside the bottle and the cartridge, which can be of the order of $6 \times 10^5$ Pa, causes the cartridge to be ejected.

Figure 6:
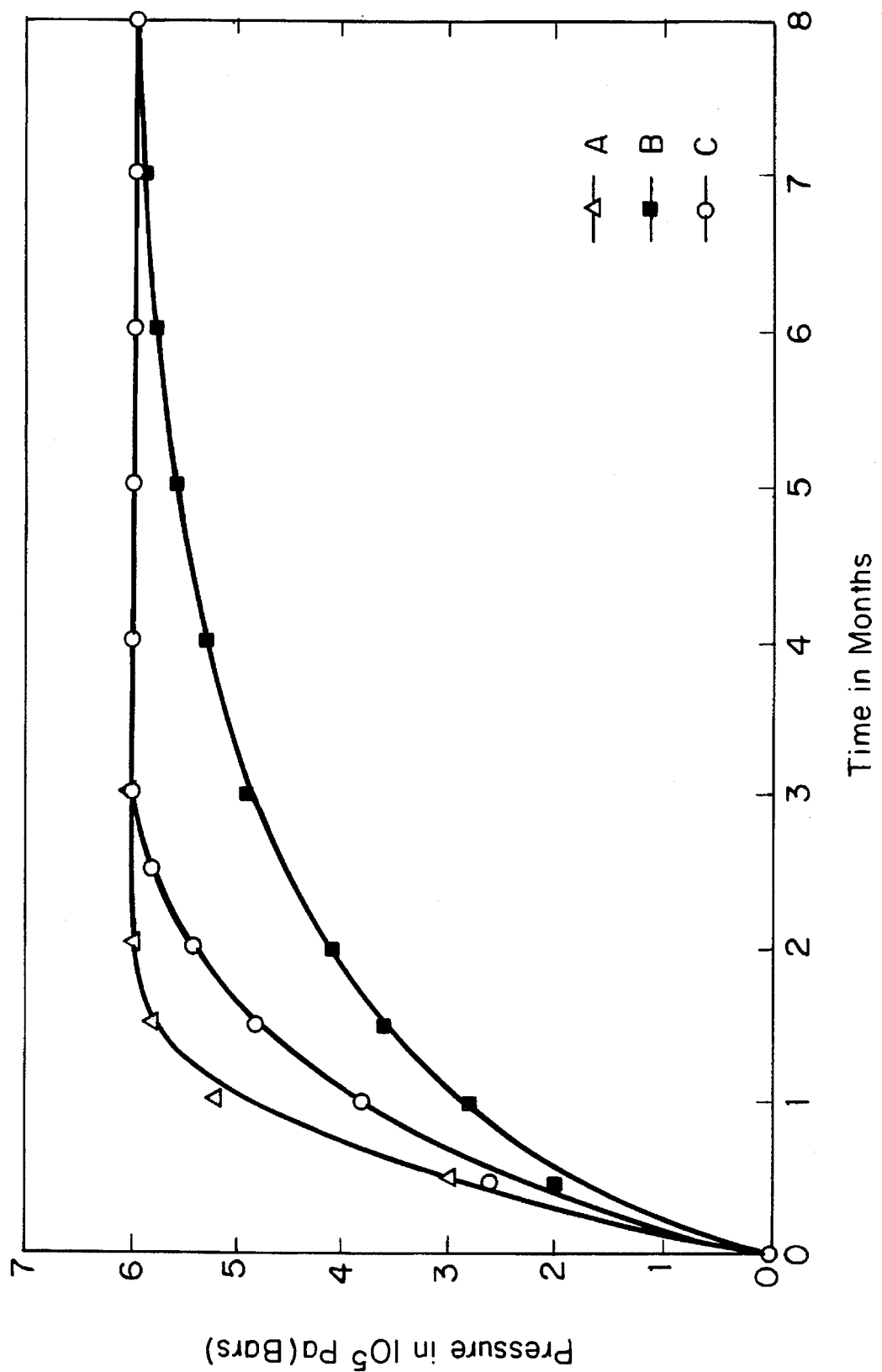
FIG. 6 represents the curves obtained by measuring the rise in pressure in bottles according to the traditional champagne method, first with a cartridge according to U.S. Pat. No. 4,792,454 and then with a cartridge according to the present invention.

FIG. 6 is a graph which shows the rise in pressure during bottle fermentation as a function of time in three bottle samples, each containing the same sugar-containing wine and each kept at a constant temperature of 13° C. The same number of yeasts, namely $10^9$ cells, originating from the same leaven were used in the three tests labeled A, B and C.

Curve (A) shows the results obtained with free yeasts according to the traditional method. Curve (B) shows the results obtained with cartridges of the type described in U.S. Pat. No. 4,792,454. Lastly, curve (C) shows the results obtained with cartridges equipped with hydrophilic and hydrophobic microporous hollow fibers filled with yeasts according to the present invention. The cartridge according to the invention used to obtain the results obtained for curve (C) contained 50 hydrophilic hollow fibers representing an exchange source of about 100 $cm^2$ and a single hydrophobic hollow fiber of about 2 $cm^2$.

Comparison of these different curves show that the cartridges according to the present invention allow a pressure rise to be obtained which is clearly an improvement relative to that obtained with the cartridges according to U.S. Pat. No. 4,792,454 and which approaches that obtained according to the traditional method for champagne wines. In fact, on examination of FIG. 6, it should be noted that a bottle fermentation is obtained with a final pressure of $6 \times 10^5$ Pa (6 bars) after 3 months in the bottle with a cartridge according to the present invention, as opposed to the 8 months required with the cartridge according to U.S. Pat. No. 4,792,454.

Microporous tubular cartridges according to the present invention may be used for the first alcoholic fermentation of wine as well as for the second fermentation of wine in the bottle according to the traditional so-called "champagne" method. Such cartridges can also be used for the production of beverages other than wine, such as beer, cider and others, and in containers other than bottles such as barrels or vats.

The technique for gathering and potting hollow fibers in situ within the cartridge body has been demonstrated to possess enhanced utility because of its simple and fast operation allowing rapid commercial-scale manufacture of cartridges. Also the possibility of producing undesired extractables is virtually eliminated. In addition, this new method works with any type of microporous hollow fiber membranes, including reverse osmosis, ultrafiltration or microfiltration hollow fibers. It works also with different sizes of fibers having, for example, an inner diameter from 50 μm to 2000 μm or more, and with a wall thickness of 10 μm to 200 μm.

An important consideration when using this poring and sealing technique which has to be taken into account when choosing the hollow fiber material and the hot-melt thermoplastic resin is that the fiber should not melt or otherwise deform/collapse the lumens of the fiber when the molten thermoplastic resin is applied. Therefore, the thermoplastic resin must be applied at a temperature below the melting point of the chosen fiber material. The melting temperatures of hollow fiber materials are well known to one of ordinary skill in the art and are also available from the manufacturer. The application temperature of the thermoplastic resin must be chosen to achieve a sufficiently low viscosity so as to make it flow easily around every fiber to form a reliable seal.

The hollow fibers can be made of polyethylene, polypropylene or cellulosic compounds, but preferably of high temperature withstanding materials such as ultrahigh-density polyethylene, polyvinylidene fluoride, polysulfone or polyethersulfone.

The thermoplastic resin can be of polyamide or EVA (ethyl-vinyl acetate) with additives like synthetic wax to lower the viscosity in order to get, for example, a viscosity of 500 mpa.s at 170° C. or less. A preferred resin is sold by Henkel S. A. under the brand name Technomelt Q 2161 FR, which is a food grade thermoplastic resin made of ethyl-vinyl acetate and a synthetic wax, and which has a viscosity of less than 350 mpa.s at 170° C.

Unlike conventional injection molding techniques which typically operate under pressures of 500 bar or more, the present invention employs low pressure potting (e.g. 2 bars or less). The preferred technique for performing potting and sealing with thermoplastic polymers includes using a pouring technique. The thermoplastic sealing resins can be applied on and around the fibers by vacuum-assisted pouring. This provides a differential pressure for assisting the thermoplastic resin to come into contact with all of the fibers as fast as possible before the resin solidifies thereby assuring a reliable seal around each of the fibers without the use of excessive pressure which could crush the fibers or even partially collapse the lumens.

Figure 8:
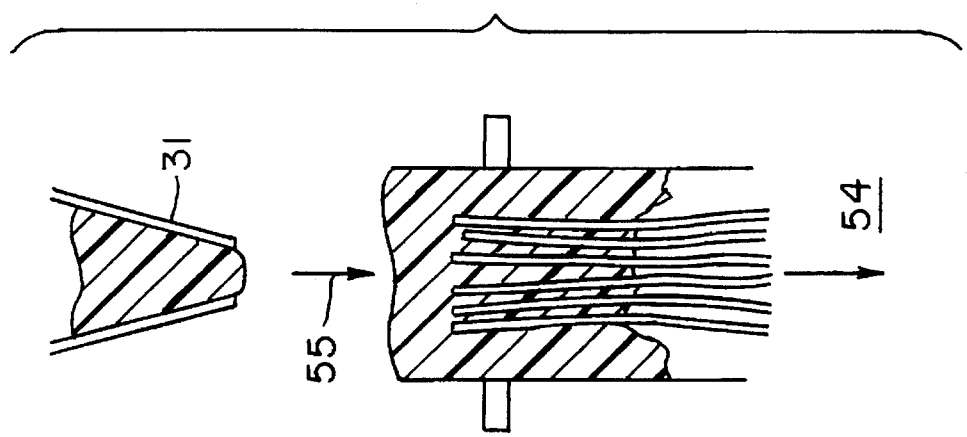
FIG. 8 is a schematic depiction of the second step of a preferred method of potting hollow fibers within a cartridge according to this invention.
Figure 7:
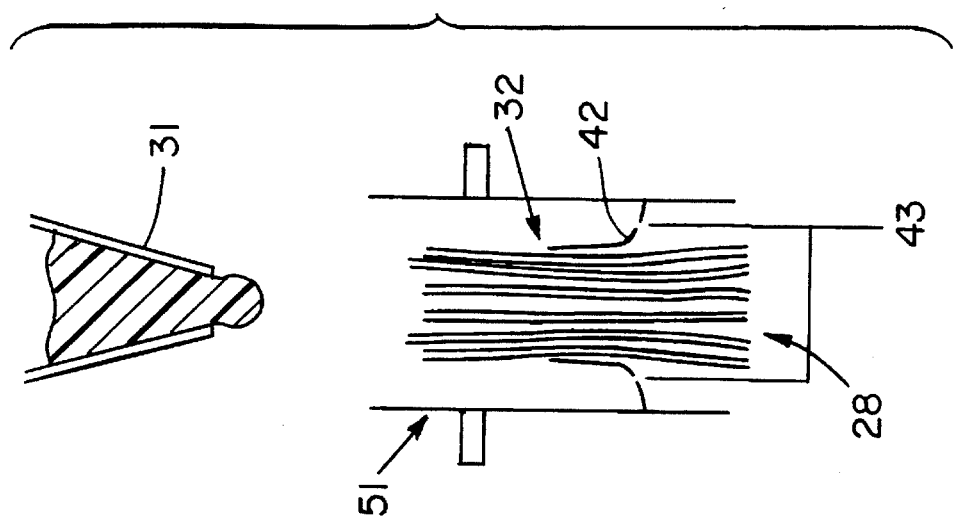
FIG. 7 is a schematic depiction of the first step of a preferred method of potting hollow fibers within a cartridge according to this invention.

With reference to FIGS. 7 and 8, one or several nozzles 31 are placed just above a housing 51 containing a plurality of hollow fibers 28 to be potted and sealed. The hollow fibers are preferably made of high density polyethylene, polysulfone or polyethersulfone, coming from suppliers such as Fresenius, AKZO or Millipore. In one example, polyethersulfone fibers having a melting point of 200° C. were used with the Technomelt thermoplastic resin. The nozzle delivering the thermoplastic was maintained at a temperature of around 190° C. and the contact temperature with the fibers was between 160° and 170° C. When delivering the thermoplastic resin, a small vacuum is applied from a source (not shown but generally indicated by reference numeral 54) between −200 and −800 mbar.

The housing 51 has a narrowed section 32 which serves as a restriction to prevent the thermoplastic resin from creeping beyond this limit. This restriction firmly maintains the hollow fibers 28 with a minimum of free space between each fiber. The restriction may be an annulus 42 or other hollow fiber retaining means that projects from the inner wall of the body of the housing. The annulus or ring is adapted for accepting hollow fibers, meaning that it will hold but not crush or damage the fibers, while still allowing the molten thermoplastic resin to flow around and seal the fibers. In the case of an injection molded body, the ring may be integral with and extend at an angle relative to the inside wall of the housing body from the inside of the body. Alternatively, the retaining ring may be added later after production of the housing. The ring may also be provided with small vent holes 43 so that the application of a differential pressure to the opposite ends of the body may be adequately communicated. After the hollow fibers are positioned within the body, a precise volume of thermoplastic resin, applied at a temperature below the melting point of the fibers, is poured. The resin should just fill the top of the housing 51 under the section 32.

Figure 9:
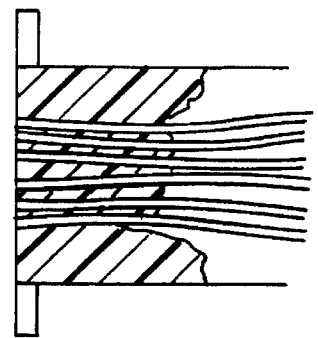
FIG. 9 is a schematic depiction of the third step of a preferred method of potting hollow fibers within a cartridge according to this invention.

As has been mentioned, in order to help the resin fill all the space between the fibers, a vacuum can be applied at the opposite side of the restriction formed by section 32 (i.e. the shell side of the bundle). Conversely, application of a low, positive pressure on the same side as the application of the thermoplastic resin (generally indicated by reference numeral 55) may also serve this function. After the short time necessary for the thermoplastic resin to cool and to solidify, the top of the housing can be cut off (see FIG. 9) by using, for example, standard metallic blades. This exposes the lumens of the fibers and readies them for use, as for example with the yeast-containing cartridge described in detail above.

While the potting and sealing technique has been thus described in the context of a hollow fiber device to be used in the refermentation of sparkling wine, it is to be understood that the principles extend generally to the potting and sealing of hollow fiber membrane modules, regardless of intended use. Nor is the invention limited to single-ended, U-shaped hollow fiber module configurations.

We claim:

1. A process for potting hollow fibers within a body, comprising the steps of:

a. forming a bundle of hollow fibers within a hollowed portion of said body, said fibers being substantially aligned longitudinally and uniformly spaced within said hollowed portion;

b. dispensing along the longitudinal axis of said bundle a molten thermoplastic composition into said hollowed portion at a contact temperature which is below the melting point of the hollow fibers but which is sufficient to lower the viscosity of said molten composition to allow said composition to flow around all fibers within the bundle;

c. applying a pressure differential to the body to assist the flow of the thermoplastic composition between each of the hollow fiber elements and the interior of the body;

d. said bundle being at a temperature low enough to cause solidification of said molten thermoplastic composition substantially upon contact with said bundle, whereby a solid thermoplastic block is formed encapsulating said bundle within said hollowed portion to create an impervious seal around every hollow fiber in said bundle and the interior of said body.

2. The process of claim 1 wherein said body includes an annular ring for accepting the bundle of hollow fibers, the ring being integral with the body and extending at an angle relative to the inside wall of said hollowed portion of the body.

3. The process of claim 1 wherein the thermoplastic composition belongs to the family of ethylene-vinyl acetate copolymers, with viscosity and adhesive modifying additives.

4. The process of claim 1 wherein the hollow fibers are made from polyethersulfone (PES).

5. The process of claim 4 wherein the contact temperature of the thermoplastic composition is between 160° and 170° C.

6. The process of claim 1 wherein the pressure differential is achieved by applying a vacuum to the bundle.

* * * * *